(12) United States Patent
Berke et al.

(10) Patent No.: US 6,286,418 B1
(45) Date of Patent: Sep. 11, 2001

(54) BARBECUE SKEWER STRUCTURE AND METHOD

(76) Inventors: Joseph J. Berke, 3248 Interlaken, West Bloomfield, MI (US) 48323; Charles Michael, 5698 Firwood, Troy, MI (US) 48098

( * ) Notice: Subject to any disclaimer, the term of this patent is extended or adjusted under 35 U.S.C. 154(b) by 0 days.

(21) Appl. No.: 09/502,633

(22) Filed: Feb. 11, 2000

(51) Int. Cl.[7] ................................................. A47J 37/04
(52) U.S. Cl. ........................ 99/421 A; 99/419; 452/198
(58) Field of Search ............................ 99/421 A, 419; 452/198

(56) References Cited

U.S. PATENT DOCUMENTS

| | | | |
|---|---|---|---|
| D. 252,128 | 6/1979 | Olson | 7/130 |
| 2,876,694 * | 3/1959 | Thomas | 99/421 A |
| 2,935,013 * | 5/1960 | Onori | 99/419 |
| 4,176,592 | 12/1979 | Doyle | 99/419 |
| 4,258,617 | 3/1981 | Akwel | 99/419 |
| 5,193,443 | 3/1993 | Carney | 99/419 |
| 5,238,445 * | 8/1993 | Green | 99/419 X |
| 5,671,659 | 9/1997 | Swindle | 99/419 |
| 6,085,642 * | 7/2000 | Terry | 99/421 A |

* cited by examiner

*Primary Examiner*—Reginald L. Alexander
(74) *Attorney, Agent, or Firm*—Chupa & Alberti, P.C.

(57) ABSTRACT

Improved barbecue and kabob skewers are described. The barbecue skewer includes a rod or brochette to support, warm and cook food and a structure that allows for easy and effective removal of food when served. As an additional feature of the remover may include a safety guard to protect fingers, hands and arms from burns. The remover may also include a brush or tough material to scrape and clean the skewer. Further, the remover may be attached to a skewer handle for storage and convenience or may be separately applied for use.

20 Claims, 2 Drawing Sheets

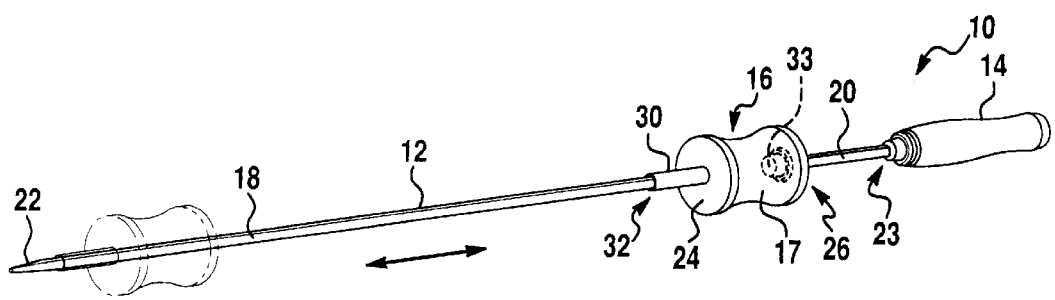
Figure 1
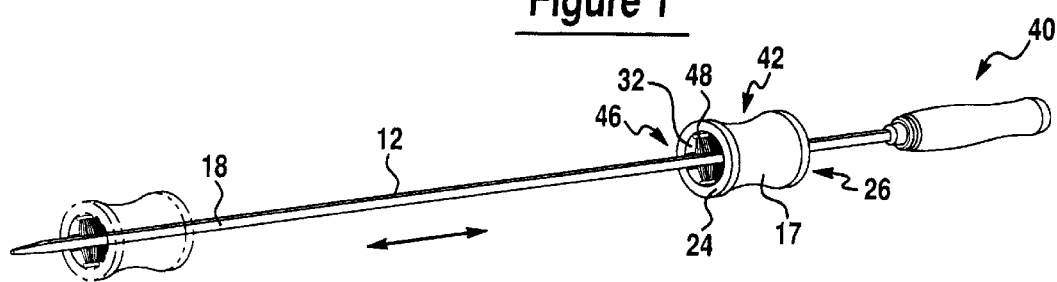
Figure 2
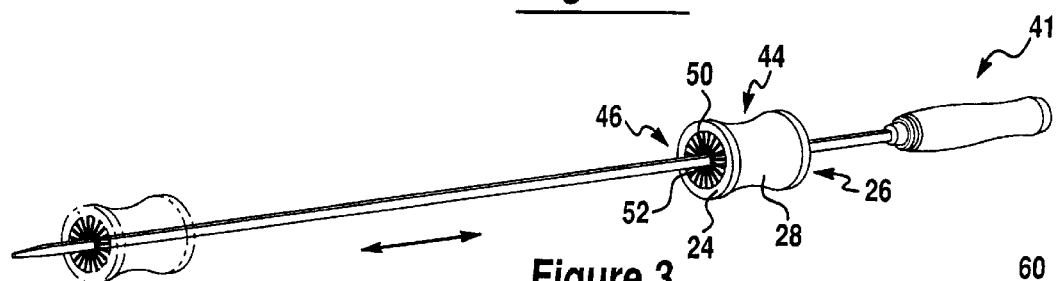
Figure 3
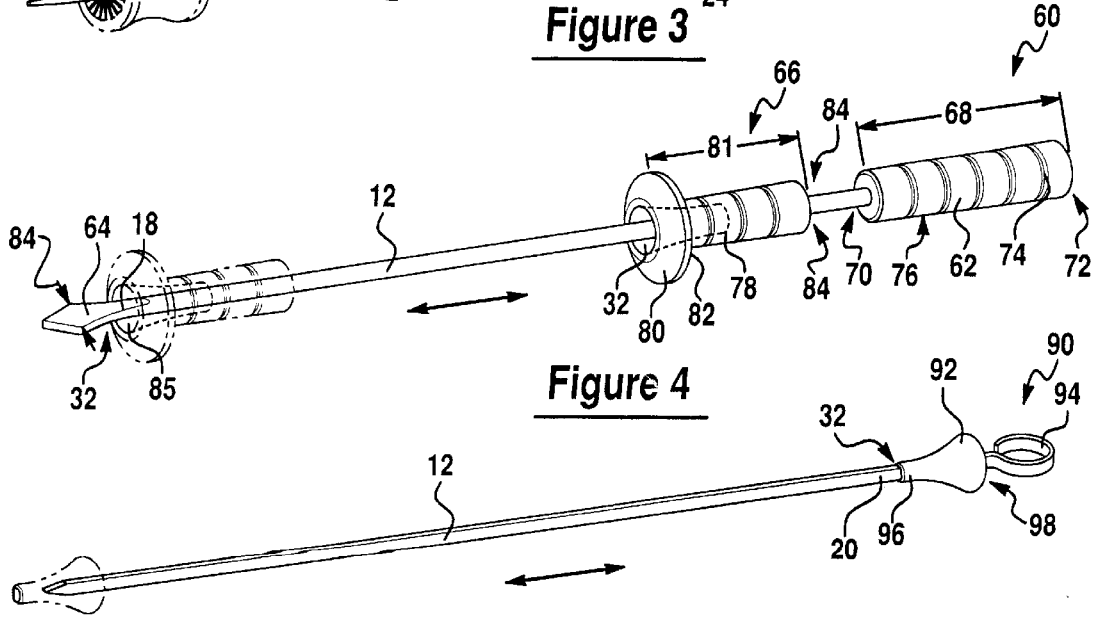
Figure 4
Figure 5

BARBECUE SKEWER STRUCTURE AND METHOD

(1) FIELD OF INVENTION

This invention relates to a barbecue skewer and more particularly to a barbecue skewer which is adapted to selectively receive food and which is further adapted to allow the received food to be cooked and to be easily removed from the skewer.

(2) BACKGROUND OF THE INVENTION

Barbecue skewers selectively receive food to be placed upon a grill or over a fire to be cooked or warmed. Some skewers possess a handle which permits a user or server to take the cooked or warmed food from the grill or fire without burning or injuring hands or fingers.

Prior art skewers, however, suffer from drawbacks. These skewers do not typically allow cooked food to be easily or readily removed from the skewer after the skewer has been taken from the grill or fire. The result is that the user or server must "scrape" or otherwise forcibly attempt to remove the food from the skewer. Such forcible removal is undesirable since there is a considerable risk of causing burns or injury to the user, server or the skewer. Forcible removal may also cause the food to "travel" across the table causing soilage, spillage and embarrassment. The food might land on the floor or some other area that may contaminate and ruin the food. The result also may be excessive handling and manipulating of the food which also may contaminate and prevent consumption of the food. This mishandling of the skewer could also result in injury and burned fingers, hands or arms when attempting to remove the hot food from the skewer.

SUMMARY OF THE INVENTION

It is an objective of the present invention to provide a skewer and a method of using that skewer which overcomes the previously delineated drawbacks of prior skewers.

It is also an objective of the present invention to provide a removing member for use in conjunction with a skewer to create a skewer which overcomes the previously delineated drawbacks of prior skewers.

According to a first aspect of the present invention, a barbecue skewer which allows food to be easily removed from the skewer is disclosed. The skewer comprises an elongated member having a proximate end and a distal end and a removing member which includes a body portion, the body portion having a hole designed to selectively surround a portion of the elongated member such that the removing member may be manually moved along the elongated member.

According to a second aspect of the present invention, a removing member designed to be placed upon on a barbecue skewer to promote easy removal of food from the skewer is disclosed. The removing member comprises a body portion having a hole designed to receive an elongated member of the skewer.

According to a third aspect of the present invention, a method for use of a barbecue skewer of the type adapted to receive food is disclosed. The method comprising the steps of providing a removing member and slidably disposing the member upon the skewer effective to remove the food from the barbecue skewer.

These and other objects, aspects, and advantages of the present invention will become apparent upon reading the following detailed description in combination with the accompanying drawings.

In employing the teachings of the present invention, a plurality of alternate constructions can be adopted to achieve the desired results and capabilities. In this disclosure, only several embodiments are disclosed. However, these embodiments are intended as examples and should not be considered as limiting the scope of the invention.

BRIEF DESCRIPTION OF THE DRAWINGS

FIG. 1 illustrates a perspective view of a skewer according to the teachings of a preferred embodiment of the invention.

FIG. 2 illustrates a perspective view of a skewer according to the teachings of a preferred embodiment of the invention.

FIG. 3 illustrates a perspective view of a skewer according to the teachings of a preferred embodiment of the invention.

FIG. 4 illustrates a perspective view of a skewer according to the teachings of a preferred embodiment of the invention.

FIG. 5 illustrates a perspective view of a skewer according to the teachings of a preferred embodiment of the invention.

DETAILED DESCRIPTION OF THE PREFERRED EMBODIMENT OF THE INVENTION

Figure 6:
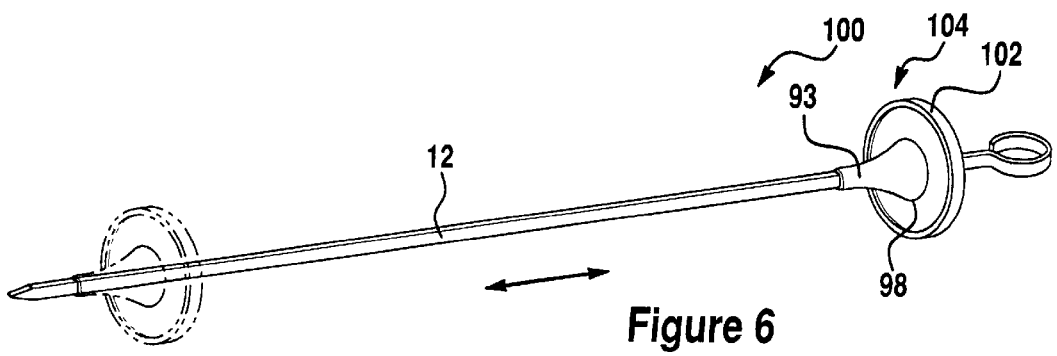
FIG. 6 illustrates a perspective view of a skewer according to the teachings of a preferred embodiment of the invention.

Referring now to FIG. 1, there is shown a barbecue skewer 10 which is produced and/or formed according to the teachings of a preferred embodiment of the present invention. Skewer 10 includes an elongated member or portion 12 (i.e., a brochette, spear or pin), a handle 14 and a removing member 16.

In the non-limiting embodiment shown in FIG. 1, elongated member 12 is made and/or manufactured from a rigid material (e.g., wood, ceramic, thermoplastic or metal), and in this non-limiting embodiment, member 12 has a rectangular and/or circular cross-section. Member 12 includes a distal end 18 and a proximate end 20. Distal end 18 includes a pointed and/or thinned portion 22 which assists a user of skewer 10 when the user desires to place items (e.g., food) onto elongated member 12. At proximate end 20, elongated member 12 is attached, coupled and/or connected to handle 14 of skewer 10.

In this non-limiting embodiment, handle 14 is manufactured and/or formed from a generally rigid material (e.g., wood, metal, ceramic, and/or a thermoplastic), and includes a cavity 23 which extends into a portion of the handle. Cavity 23 is shaped to receive the elongated member 12 and to form an interference fit with member 12. In other words, the elongated member is "wedged" into handle 14. Further, handle 14 is generally cylindrical with a diameter that varies along its length such that it is ergonomically designed for optimum gripping.

Skewer 10 also includes removing member 16 which includes a body portion 17. In the non-limiting embodiment shown in FIG. 1, body portion 17 is generally cylindrical, however, body portion 17 may also be square, rectangular, twisted and/or any other suitable shape, and removing member 16 is at least partially made and/or manufactured from a rigid material (e.g., wood, metal and/or a thermoplastic). It will be noted that all the following non-limiting embodiments will have removing members which may be at least partially made and/or manufactured from ceramic, wood, metal, a thermoplastic and/or any other suitable material. Referring back to the non-limiting embodiment in FIG. 1, member 16 also includes ends portions 24, 26 and guide member 30. A hole 32 extends through guide member 30, body portion 17 and end portions 24, 26. Hole 32 receives elongated member 12 such that member 16 is free to traverse member 12 from distal end 18 to proximate end 20 and from proximate end 20 to distal end 18. In use, food will typically be placed in a conventional manner along elongated member 12 while removing member 16 is near proximate end 20. Food will then be cooked and/or barbecued in a conventional manner. Once cooked, a user of skewer 10 may remove the food from the elongated member 12 by manually moving member 16 from proximate end 20 to distal end 18.

As can be seen in the non-limiting embodiment in FIG. 1, member 16 is thinner near body portion 17 than it is nearer ends 24, 26. This design has special advantage for a user of skewer 10. The user may grip member 16 at body portion 17 which allows the user to place force against member 16 toward distal end 18 without the user's fingers "sliding" and/or "slipping" toward end 24.

Further, removing member 16, in the non-limiting embodiment of FIG. 1, includes guide member 30. As can be seen, guide member 30 has a substantially smaller diameter than the rest of removing member 16 and is in very close contact with elongated member 12. Guide member 30 gives removing member 16 an added advantage. As removing member 16 is moved toward distal end 18, guide member 30 tends to "pry" into the area between a first piece of food on skewer 10 and elongated member 12, thereby making that first piece of food much easier to move along elongated member 12.

Further yet in the non-limiting embodiment shown in FIG. 1, removing member 16 includes a cavity and/or recessed portion 33 which is shown in phantom. Recessed portion 33 is formed within end 26 such that removing member 16 may be "wedge fit", screwed and/or otherwise attached to handle 14. When removing member 16 is forcibly pushed against an end 34 of handle 14, removing member 16 becomes interference fit upon handle 14 and is relatively immobile. It is especially convenient to place the removing member 16 in this relatively immobile state for storage of skewer 10.

Referring now to FIGS. 2–3, there are shown skewers 40, 41 which are substantially similar to skewer 10 with the exception that removing member 16 has been replaced with respective removing members 42, 44. As can be seen in the non-limiting embodiments in FIGS. 2–3, members 42, 44 are thinner near body portions 17 than they are nearer ends 24, 26. This design has special advantage for a user of skewers 40, 41. The user may grip members 42, 44 at body portions 17 which allows the user to place force against member 16 toward distal end 18 without the user's fingers "sliding" and/or "slipping" toward end 24.

In the non-limiting embodiment shown in FIG. 2, member 42 has a substantially open inner portion 46 which has been filled with a scraping material 48 (e.g., brushes). Scraping material 48 is attached, coupled and/or connected (e.g., adhesively secured) to an inner wall 52 of removing member 42 such that scraping material 48 remains in close contact with elongated member 12 as removing member 42 is moved along member 12. In this manner, scraping material 48 "scrapes", "brushes", cleans and/or removes food particles that are left upon elongated member 12 as food is pushed off of member 12.

In the non-limiting embodiment shown in FIG. 3, member 44 also includes substantially open inner portion 46, but inner portion 46 has now been filled with a scraping material 50 as opposed to scraping material 48. Scraping material 50 comprises bristles 50 (e.g., conventional metal bristles) which are attached and/or connected to and extend from inner wall 52 of removing member 44 into open portion 46 to contact and "scrape", "brush", clean and/or remove food particles which are left upon elongated member 12. In one embodiment of the invention, bristles 50 are placed in holes within the inner wall 52 of removing member 44 and bristles 50 are glued and/or adhesively attached within those holes to removing member 44.

Referring now to FIG. 4, there is shown a skewer 60 which is substantially identical to skewer 10 with the exception that handle 14, pointed portion 22 and removing portion 16 have been replaced with a handle 62, a pointed portion 64 and removing member 66.

In this non-limiting embodiment, handle 62 is generally cylindrical and has a diameter which continually increases along its length 68 from its end 70 nearest to elongated member 12 to its end 72 furthest from elongated member 12. Handle 62 also includes circumferential grooves 74 formed in an outer surface 76.

Further, in this non-limiting embodiment, removing member 66 includes a body portion 78 and a shield and/or protective member or portion 80. Body portion 78 is generally cylindrical and has a diameter which continually increases along its length 81 from an end 82 nearest protective member 80 to an end 84 furthest from protective member 80. Protective member 80 is attached, coupled and/or connected (e.g., adhered, glued and/or integrally formed with) to end 82. Protective member 80 provides a user with protection from hand and/or finger burns as the user moves the removing member 66 toward the distal end 18 of member 12 to remove hot food from member 12.

Further yet in this non-limiting embodiment, pointed portion 64 is substantially "diamond" shaped with a portion 84 which is wider than the diameter of at least a portion of hole 32 of member 66. Because portion 84 is wider than hole 32, member 66 cannot slide off the distal end 18 or pointed portion 64 of elongated member 12. However, removing member 66 may also include a cavity or recessed portion 85 which has a larger diameter than hole 32. Recessed portion 85 allows a user of skewer 60 to move removing member 66 in a manner that allows protective member 80 to extend away from elongate member 12 beyond wider portion 84 and/or pointed portion 64 such that food may be easily and fully removed from elongated member 12.

Referring now to FIG. 5, there is shown a skewer 90 which is substantially identical to skewer 10 with the exception that removing member 16 and handle 14 have been respectively replaced with a removing member 92 and a handle 94.

In the non-limiting embodiment shown in FIG. 5, handle 94 and elongated member 12 are formed from a single material. Near the proximate end 20 of elongated member 12, a portion of the single material has been formed into substantially circular shaped handle 94 in a known and conventional manner.

Further, in the non-limiting embodiment shown in FIG. 5, removing member 92 includes only a body portion 93 which is substantially "funnel" shaped with a circumference that increase from an end 96 to an end 98. The funnel shape of body portion 93 and/or removing member 92 allows a user of skewer 90 to push removing member 92 into a first piece of food which is on elongated member 12 and the portion of the funnel shaped body portion 93 with the smallest circumference tends to "pry" under the first piece of food, hence making that piece of food easier to move. Further, that first piece of food is substantially and eventually inhibited and/or stopped from moving toward the largest circumference portion of body portion 93 by the ever increasing circumferences of body portion 93. As can be seen in FIG. 5, removing member 92 may be slid all the way off of elongate member 12.

Now referring to FIG. 6, there is shown a skewer 100 which is substantially identical to skewer 90 with the exception that a protective member 102 has been attached to, connected to and/or integrally formed with body portion 93 to form removing member 104. In this non-limiting embodiment, protective member 102 is substantially circular and has a circumference and/or diameter substantially greater than body portion 93. Further, protective member 102 is attached to and or integrally formed at end 98 of body portion 93. A user of skewer 100 can manually push on member 102 and move portion 93 into contact with hot food that has been placed upon elongated member 12 and member 102 will protect the user from being burned by the food.

Figure 7:
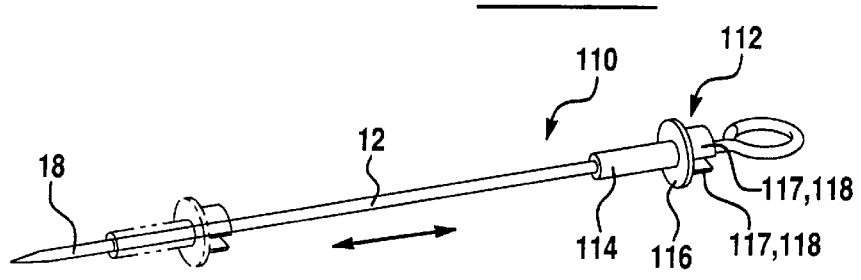
FIG. 7 illustrates a perspective view of a skewer according to the teachings of a preferred embodiment of the invention.

Referring now to FIG. 7, there is shown a non-limiting embodiment of a skewer 110 which is substantially identical to skewer 90 with the exception that removing member 92 has been replaced with removing member 112. Removing member 112 comprises a substantially cylindrical guide member 114, a substantially circular protective member 116 and a body portion 117 which is comprised of gripping members or protrusions 118.

In this non-limiting embodiment, the guide member 114, the protective member 116 and the gripping members 118 may be attached to, connected to and/or integrally formed with each other. A user of skewer 110 may place a thumb and index finger on the gripping members 118 of removing member 112 and may push removing member 112 toward distal end 18 to remove hot food from elongated member 12. As removing member 112 is moved toward distal end 18, guide member 114 tends to "pry" into the area between a first piece of food on skewer 110 and elongated member 12 thereby making that first piece of food much easier to move along elongated member 12 and protective member 116 protects the thumb and index finger of the user during food removal.

Figure 8:
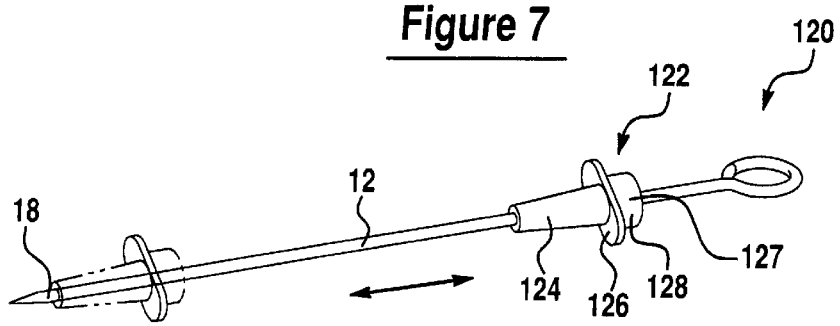
FIG. 8 illustrates a perspective view of a skewer according to the teachings of a preferred embodiment of the invention.

Referring now to FIG. 8, there is shown a non-limiting embodiment of a skewer 120 which is substantially identical to skewer 110 with the exception that removing member 112 has been replaced with removing member 122. Removing member 122 comprises a substantially "funnel" shaped guide member 124, a substantially elliptical protective member 126 and a body portion 127 which is comprised of gripping member or protrusion 128.

In this non-limiting embodiment, the guide member 124, the protective member 126 and the gripping member 128 may be attached to, connected to and/or integrally formed with each other. A user of skewer 120 may place a thumb and index finger on the gripping member 128 of removing member 122 and push removing member 122 toward distal end 18 to remove hot food from elongated member 12. As removing member 122 is moved toward distal end 18, guide member 124 tends to "pry" into the area between a first piece of food on skewer 120 and elongated member 12 thereby making that first piece of food much easier to move along elongated member 12 and protective member 126 protects the thumb and index finger of the user during food removal. Additionally, the funnel shape of the guide member 124 prevents food from traveling along guide member 124 toward protective member 126 which offers the thumb and index finger of the user of skewer 120 even greater protection.

Figure 9:
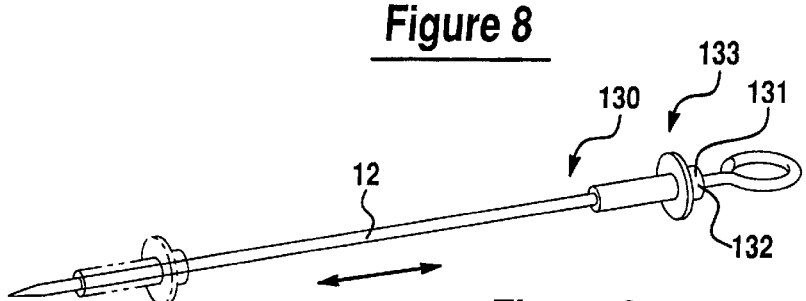
FIG. 9 illustrates a perspective view of a skewer according to the teachings of a preferred embodiment of the invention.

Referring now to FIG. 9, there is shown a non-limiting embodiment of a skewer 130 which is substantially identical to skewer 110 with the exception that body portion 117 or gripping members 118 have been replaced by a body portion 131 which is a substantially cylindrical gripping member or protrusion 132 thereby forming removing member 133.

Figure 10:
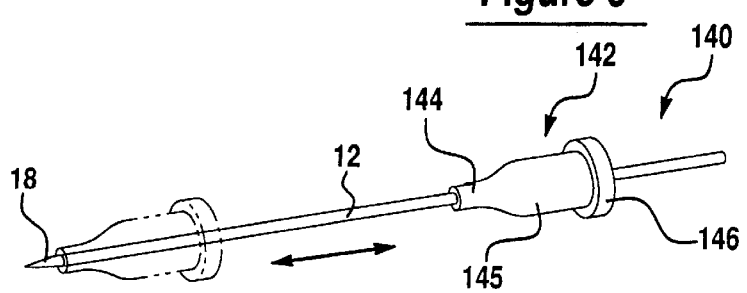
FIG. 10 illustrates a perspective view of a skewer according to the teachings of a preferred embodiment of the invention.

Referring now to FIG. 10, there is shown a non-limiting embodiment of a skewer 140 which is substantially identical to skewer 90 with the exception that removing member 92 has been replaced with removing member 142 and handle 94 has been eliminated. Removing member 142 comprises a substantially funnel shaped guide member 144, substantially cylindrical body portion 145 and a substantially circular and/or cylindrically shaped protective member 146.

The guide member 144, the body portion 145 and the protective member 146 may be attached to, connected to and/or integrally formed with each other. A user of skewer 140 may push removing member 142 toward distal end 18 to remove hot food from elongated member 12. As removing member 142 is moved toward distal end 18, guide member 144 tends to "pry" into the area between a first piece of food on skewer 140 and elongated member 12 thereby making that first piece of food much easier to move along elongated member 12 and protective member 146 protects the user during food removal. Additionally, the funnel shape of the guide member 144 prevents food from traveling along guide member 144 toward protective member 146 which offers the thumb and index finger of the user of skewer 140 greater protection. Also, by eliminating handle 94, a user of skewer 140 may place and utilize removing member 142 on elongated member 12 after food on skewer 140 is fully cooked.

It shall be understood that, although the aforementioned skewers 10, 40, 41, 60, 90, 100, 110, 120, 130 and 140 were described as skewers with only one elongated member 12, removing members 16, 42, 44, 66, 92, 104, 112, 122, 133, and 142 may also be used with skewers having multiple elongated members 12.

It shall be further understood that removing members 16, 42, 44, 66, 92, 104, 112, 122, 133, and 142 may be used in conjunction with any of the handles 14, 68, and 94 or with no handle at all.

It shall further be understood that removing member 16, 42, 44, 66, 92, 104, 112, 122, 133, and 142 may be sold separately from the skewers upon which they are used.

It shall also be understood that removing members 16, 42, 44, 66, 92, 104, 112, 122, 133, and 142 may be made of a heat resistant material and may be placed between individual food items of a single elongated member 12.

It should be understood that the invention is not limited to the exact embodiment or construction which has been illustrated and described but that various changes may be made without departing from the spirit and the scope of the invention.

What is claimed is:

1. A barbecue skewer which allows food to be easily removed from said skewer, said skewer comprising:
    an elongated member having a proximate end and a distal end;
    a removing member which includes a body portion, said body portion having a hole designed to selectively surround a portion of said elongated member such that said removing member may be manually moved along said elongated member; and
    a handle which is attached to said proximate end of said elongated member;
    wherein said removing member includes a guide portion which is in close contact with said elongated member and which pries food away from said elongated member; and an end portion and wherein said body portion is smaller than said end portion and said body portion is designed to be contacted by said user of said skewer and said end portion is designed to reside between said user and said food during usage of said removing member.

2. A barbecue skewer as in claim 1, wherein said removing member includes a protective member and said body portion is a gripping member.

3. A barbecue skewer as in claim 1, wherein said removing member includes a scraping material that contacts said elongated member during movement of said removing member.

4. A barbecue skewer as in claim 1, wherein said body portion is funnel shaped.

5. A barbecue skewer as in claim 1, wherein said elongated member includes a pointed portion which is large enough to prevent said removing member from sliding off said elongated member and wherein said removing member includes a recessed portion which allows a portion of said removing member to extend beyond said pointed portion.

6. A barbecue skewer as in claim 1 wherein said removing member is at least partially made from a ceramic material.

7. A barbecue skewer as in claim 1 wherein said removing member is at least partially made from wood.

8. A barbecue skewer as in claim 1 wherein said removing member is at least partially made from a thermoplastic.

9. A barbecue skewer as in claim 1 wherein said removing member is selectively attachable to said handle.

10. A removing member designed to be placed upon a barbecue skewer to promote easy removal of food from said skewer, said removing member comprising:
    a body portion having a hole designed to receive an elongated member of said skewer;
    a removing member further comprising a scraping material which is attached to said body portion and which is designed to selectively contact said elongated member.

11. A removing member as in claim 10 further including a scraping material attached to said body portion, wherein said scraping material contacts said elongated member during movement of said removing member.

12. A removing member as in claim 11 wherein said scraping material is a brush.

13. A removing member as in claim 10 further including an end portion wherein said body portion is smaller than said end portion of said removing member, said body portion being designed to be contacted by a user of said removing member and said end portion designed to reside between said user and said food during usage of said removing member.

14. A removing member as in claim 10 further including a guide portion which is attached to said body portion, said guide portion designed to pry food away from said elongated member.

15. A removing member as in claim 10 further including a protective member attached to said body portion.

16. A method as in claim 15, wherein said removing member includes a scraping material which contacts said skewer during said step of slidably disposing said member upon said skewer.

17. A method as in claim 15, wherein said barbecue skewer has an elongated member and wherein said removing member is movably disposed upon said elongated member.

18. A method as in claim 15 wherein said removing member includes a guide member which pries food away from said elongated member.

19. A removing member as in claim 10 wherein said body portion of said removing member is funnel shaped.

20. A method for use of a barbecue skewer of the type adapted to receive food, said method comprising the steps of:
    providing a removing member;
    slidably disposing said member upon said skewer, effective to remove said food from said barbecue skewer;
    wherein said removing member includes a scraping material which contacts said skewer during said step of slidably disposing said member upon said skewer.

* * * * *